UNITED STATES PATENT OFFICE.

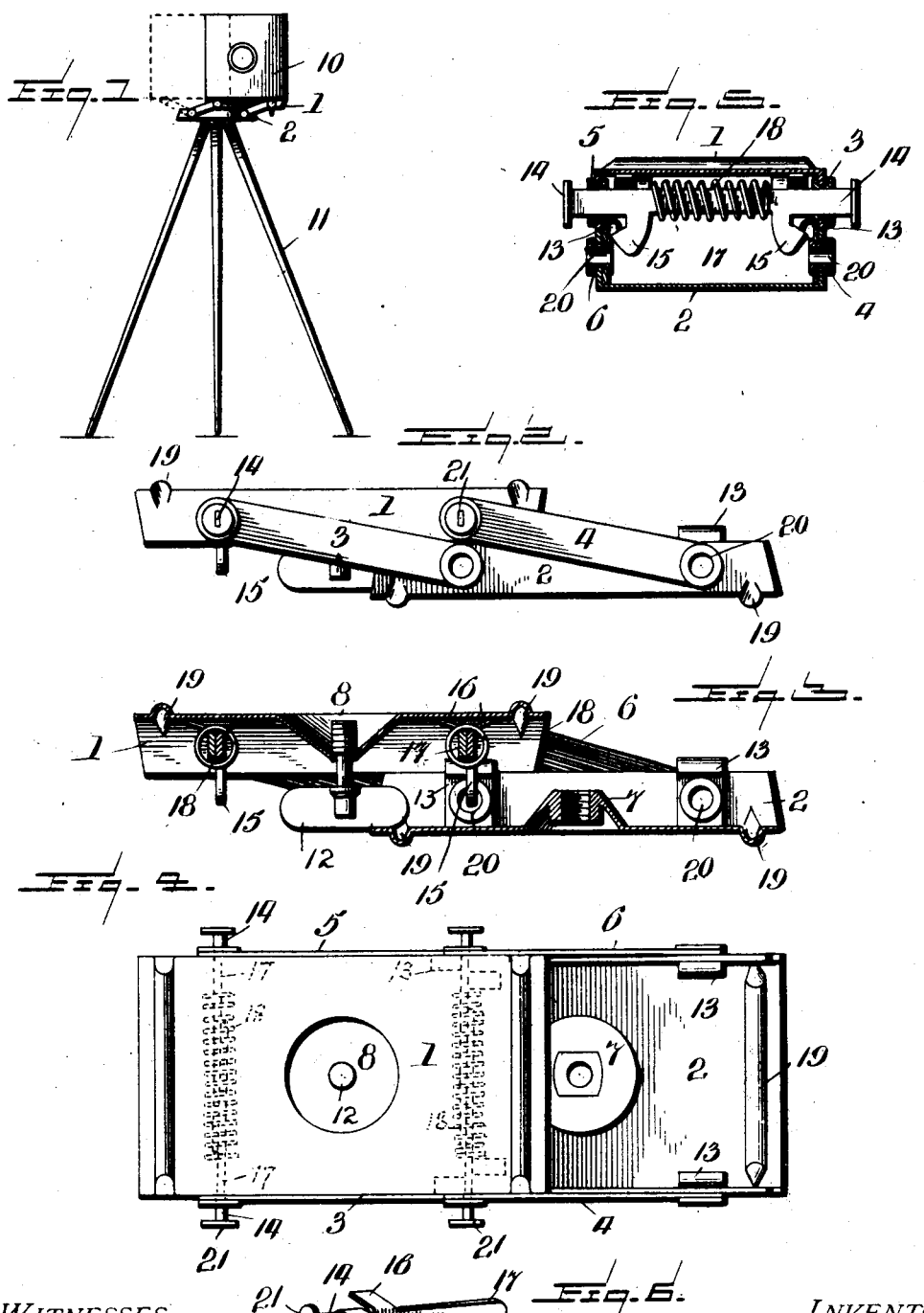

JULIUS KNUD LUDVIG THOMSEN, OF BUFFALO, NEW YORK, ASSIGNOR OF ONE-HALF TO ADAM B. THOMSEN, OF BUFFALO, NEW YORK.

CAMERA ATTACHMENT.

SPECIFICATION forming part of Letters Patent No. 713,177, dated November 11, 1902.

Application filed August 20, 1902. Serial No. 120,412. (No model.)

*To all whom it may concern:*

Be it known that I, JULIUS KNUD LUDVIG THOMSEN, a citizen of the United States, residing at Buffalo, in the county of Erie, State of New York, have invented certain new and useful Improvements in Camera Attachments, of which the following is a specification, reference being had therein to the accompanying drawings.

The invention relates to improvements in camera attachments, and particularly to an attachment adapted to move to produce stereoscopic pictures with any single-lens camera.

The invention has for its object to produce a new and useful article of manufacture adapted to simplify and cheapen the production of stereoscopic pictures, as by the use of this pocket-tripod attachment the double camera, which otherwise is indispensable for this class of pictures, may be discarded and the same result obtained through the agency of any kodak or single-lens camera in connection with the tripod attachment by which the camera may be shifted the predetermined distance to maintain parallelism in its original and shifted positions.

A further object of the invention is to provide a locking mechanism for securing the device practically solid in its two predetermined positions by simply pressing the camera down into position and which may be opened by a slight pressure upon the mechanism when it is desired to shift the camera, thus providing against any movement of the camera incident to operating the shutter or otherwise and the resulting imperfect pictures.

Other and further objects and advantages of the invention will be hereinafter set forth, and the novel features thereof defined by the appended claims.

In the drawings, Figure 1 is an elevation illustrating the principle of the invention; Fig. 2, a similar view of the pocket-tripod attachment; Fig. 3, a central vertical longitudinal section thereof; Fig. 4 a plan, Fig. 5 a central vertical cross-section, and Fig. 6 a detail perspective, of one of the push-buttons.

Like figures of reference refer to like parts in the several figures of the drawings.

The tripod attachment proper consists of top and bottom flanged plates 1 and 2, shaped alike to form a casing when in contact with each other. The socket or hole 8 in the middle of the top plate 1 is for passing the securing-screw 12 through, which holds the camera 10 upon the attachment. On the corresponding place of the bottom plate 2 is secured a depressed lug or a boss 7, suitably threaded for fastening the apparatus on the tripod 11 by means of the usual screw thereon. The plates 1 and 2 are linked together by the similarly-shaped links 3, 4, 5, and 6, two on each side, and the parts thus connected together, forming a parallel mechanism, allow the plate 1 by the aid of the four links to be swung from one side to the other of the plate 2 when the latter is fastened to the tripod. In Fig. 1 it will be noticed the tripod attachment is shown swung to the opposite side from Fig. 2. The length of the links is such as to give the two outer points in which the camera can be placed the right distance apart for the taking of optically-correct pictures.

The locking mechanism may be of any desired character; but I have illustrated herein a preferred construction for automatically locking the plates in their shifted position relative to each other, in which the lower plate is provided upon opposite sides and at opposite ends adjacent to the pivots of the links thereon with flange-plates 13, adapted to coöperate with push-buttons 14, carried by the other plate, which buttons are provided with hooks 15 to engage beneath the flange of the plates 13 and prevent the vertical shifting of the parts when in contact with each other. These push-buttons are also provided with guide-plates 16 upon their upper surface, adapted to bear against the under surface of the plates by which they are carried, and with an extended end 17, parallel with a similar end of the button upon the opposite side of the plate, the two ends being surrounded by and inclosed within a coiled spring 18, which by bearing against the hooks 15 forces the buttons outward from each other to hold the hooks in contact with the plates. When it is desired to release the plates in order to shift to the opposite position, the opposite buttons are pressed toward each other, thus compressing the spring and drawing the hooks from contact with the plates 13. Each of the plates is provided at its end portion with a struck-up flange or projection 19 for the purpose of stiffening the body thereof, while the links and latch-plates may be secured to the plate 2 by means of an open eyelet 20, passing through both of the parts, as illustrated. The push-button is shown in Fig. 6 as formed of a single piece of material having the parts cut and bent therefrom with the head 21 applied thereto; but it is obvious that it may be formed in any desired manner.

Fig. 1 illustrates a tripod and camera with the pocket-tripod attachment as the intervening member. As will be seen by the dotted lines in Fig. 1, the tripod attachment makes it possible to take optically-correct stereoscopic pictures with any single-lens camera simply by swinging the camera over by the aid of the tripod attachment after the first picture is taken and then expose for the second picture.

The pocket-tripod attachment is, as illustrated, very simple in construction and can be produced at small cost. It can be made of any desirable material, and its simple design with the before-mentioned parallel motion makes it of a small pocket size, which is much appreciated by amature photographers, as is also the fact that only a single-lens camera or kodak need be carried, even for taking stereoscopic pictures.

It will be obvious that changes may be made in the details of construction and configuration and also of the method of securing the attachment without departing from the spirit of the invention as defined by the appended claims. It will also be seen that the laterally-shifting plates are capable of use upon any form of support other than a tripod, which is merely herein described as the usual form of support.

Having described my invention and set forth its merits, what I claim, and desire to secure by Letters Patent, is—

1. A camera attachment comprising superposed plates one movable to opposite sides of the center of the other, and links pivotally connected at their opposite ends to said plates; substantially as specified.

2. A camera attachment comprising superposed plates one movable to opposite sides of the center of the other, links pivotally connected at their opposite ends to said plates, a securing attachment for a camera carried by the upper plate, and a securing attachment for a support carried by the lower plate; substantially as specified.

3. A camera attachment comprising plates having side flanges disposed toward and resting upon each other, and parallel links pivotally connected at their opposite ends to said flanges at opposite sides of the center of the plates; substantially as specified.

4. A camera attachment comprising plates having side flanges disposed toward each other, parallel links pivotally connected at their opposite ends to said flanges, a depressed threaded boss carried by the lower plate, and a securing-screw for a camera extending through a socket formed in the upper plate; substantially as specified.

5. A camera attachment comprising a base, a link pivoted at one end to said base at one side of its center, and means for pivotally securing the opposite end of said link to a camera at the same side of the center of the camera, whereby a common single-lens camera is adapted to produce correct stereoscopic negatives.

6. A camera or tripod attachment comprising a base adapted to be secured to a tripod, a part adapted to support a camera, and an intermediate movable connecting means adapted to maintain parallelism of the camera in its original and shifted positions and to move said camera over the center of its base in its shifted position, whereby a common single-lens camera is adapted to produce correct stereoscopic negatives.

7. A camera attachment comprising superposed plates one movable to opposite sides of the center of the other, links pivotally connected at their opposite ends to said plates, and means for automatically locking the plates in each of their shifted positions; substantially as specified.

8. A camera attachment comprising superposed plates one movable to opposite sides of the center of the other, links pivotally connected at their opposite ends to said plates, means for automatically locking the plates in each of their shifted positions, and means for releasing the locking mechanism carried by the camera-supporting plate; substantially as specified.

9. A camera attachment comprising superposed plates, links pivotally connected at their opposite ends to said plates, a flange locking-plate carried by one plate, and a sliding push-button carried by the opposite plate to engage said locking-plate; substantially as specified.

10. A camera attachment comprising superposed plates, links pivotally connected at their opposite ends to said plates, a flange locking-plate carried by one plate, a sliding push-button carried by the opposite plate to engage said locking-plate, guide-lugs upon one face of said push-button to bear against the body of the plate by which it is carried, and a spring for normally projecting said push-button outward from the plate; substantially as specified.

11. A camera attachment comprising superposed plates, links pivotally connected at their opposite ends to said plates, a flange locking-plate carried by one plate, a sliding push-button carried by the opposite plate to engage said locking-plate, guide-lugs upon one face of said push-button to bear against the body of the plate by which it is carried, and a spring for normally projecting said push-button outward from the plate, said push-button and holding-plate being respectively mounted at the opposite pivotal points of the links; substantially as specified.

12. A locking mechanism for a camera attachment comprising oppositely-disposed locking-plates, parallel push-buttons having hooked portions disposed in opposite directions to engage said plates, extended portions to each of said push-buttons, and a coiled spring surrounding said extended portions and bearing against the hooked portions; substantially as specified.

13. A camera-supporting plate having side flanges upon which push-buttons are mounted at its opposite ends, a supporting-plate upon which locking-plates are mounted at opposite ends, and links pivotally connected at their opposite ends to said camera-holding plate, said supporting-plate, the push-buttons and locking-plates being mounted at the pivotal points of connection with said links; substantially as specified.

In testimony whereof I affix my signature in presence of two witnesses.

JULIUS KNUD LUDVIG THOMSEN.

Witnesses:
 IRVIN S. CALHOUN,
 GEORGE COOK.